United States Patent [19]

Campbell et al.

[11] 3,737,431

[45] June 5, 1973

[54] PREPARATION OF SULFENAMIDES BY CATALYTIC OXIDATION

[75] Inventors: Robert Henry Campbell; Raleigh Warren Wise, both of Akron, Ohio

[73] Assignee: Monsanto Company, St. Louis, Mo.

[22] Filed: Feb. 24, 1970

[21] Appl. No.: 13,804

Related U.S. Application Data

[63] Continuation-in-part of Ser. No. 634,096, April 27, 1967, abandoned.

[52] U.S. Cl.......260/247.1, 260/239 R, 260/239 BB, 260/293.4, 260/306.6 A, 260/326.82, 260/551 R
[51] Int. Cl..............................................C07d 87/46
[58] Field of Search................260/247.1, 306.6 A, 260/551 S

[56] References Cited

UNITED STATES PATENTS 3,436,400  4/1969  Freyermuth et al...............260/247.1

*Primary Examiner*—Alex Mazel
*Assistant Examiner*—James H. Turnipseed
*Attorney*—Richard O. Zerbe, J. E. Maurer and Neal E. Willis

[57] ABSTRACT

Metal phthalocyanines are oxidation catalysts for the preparation of sulfenamides in the reaction of primary or secondary amines with 2-mercaptobenzothiazole, an alkali metal salt of 2-mercaptobenzothiazole, a dithiocarbamate, a dithiocarbamic acid, a thiuram disulfide, or 2,2'-dithiobis(benzothiazole).

17 Claims, No Drawings

PREPARATION OF SULFENAMIDES BY CATALYTIC OXIDATION

REFERENCE TO RELATED APPLICATIONS

This application is a continuation-in-part of application Ser. No. 634,096 filed Apr. 27, 1967 now abandoned.

BACKGROUND OF THE INVENTION

The invention pertains to the field of chemical processes for preparing sulfenamides. The applicable U.S. patent classifications are found under Heterocyclic Carbon Compounds, more specifically Class 260-247.1 and 260-306.6.

Certain sulfenamides are known to be useful vulcanization accelerators for rubber, lubricating oil additives and fungicides. It is known that 2-mercaptobenzothiazole and 2,2'-dithiobis(benzothiazole) react with primary and secondary amines to form sulfenamides in the presence of certain oxidizing agents. Oxidizing agents such as hypohalite, hydrogen peroxide, chlorine, potassium ferricyanide, and potassium persulfate are taught in U.S. Pat. No. 2,762,814 (Cl. 260-306.6) of Lunt assigned to Monsanto Chemicals Limited (1956). Sodium hypohalite is used commercially as an oxidizing agent in the preparation of sulfenamides. A large volume of sodium hypohalite is needed to prepare a sulfenamide. Usually, 25 to 50 percent excess sodium hypohalite is needed over the theoretical amount. Our new catalytic oxidation method for preparing sulfenamides does not require the sodium hypohalite solution used in the past. Instead, our process uses catalyst and oxygen or air as the oxidant. Consequently, the volume required in the past for the sodium hypohalite solution is available for reactants in our process.

Metal phthalocyanines and their sulfonates are known catalysts for preparing organic disulfides. U.S. Pat. No. 3,116,329 (Cl. 260-567) of Hayes assigned to Universal Oil Products Company (1963) teaches the use of Group VIII metal phthalocyanines in the presence of an oxidizing agent to prepare thiuramdisulfides from amines and carbon disulfide. U.S. Pat. No. 3,116,328 (Cl. 260-567) to Cox assigned to Universal Oil Products Company (1963) teaches the use of a Group VIII metal phthalocyanine catalyst for the catalytic oxidation of an alkali salt of a dialkyldithiocarbamic acid to prepare tetraalkylthiuram disulfides. British Pat. No. 963,122 assigned to American Cyanamid Company teaches the use of a water-soluble metal phthalocyanine or an alkali neutralized water-soluble salt thereof as catalyst in the presence of oxygen to prepare aromatic disulfides from thiophenols.

SUMMARY

A number of phthalocyanines and their derivatives are oxidation catalysts for the preparation of sulfenamides. The formula for the preferred catalysts useful in this invention is

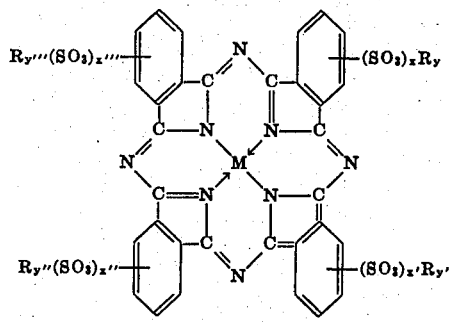

M can be cobalt, manganese, vanadium, chromium, nickel, iron, copper, or platinum. R can be hydrogen, barium, sodium, potassium, ammonium, calcium, zinc, or magnesium. The $x, x', x''$ and $x'''$ independently are numbers from 0 to 4. The numerical values of $y, y', y''$, and $y'''$ are dependent on the cation charge and on the values of $x, x', x''$, and $x'''$ in order to satisfy the stoichiometry. In the non-sulfonated cobalt phthalocyanines of this invention $x, x', x''$, and $x'''$ and $y, y', y''$, and $y'''$ are 0.

The function of the sulfonic acid group is to make the phthalocyanine water soluble. Polar functional groups other than $S(:O)_2OH$, for example, OH, -COOH, or -P-(O)(OH)2 can be used to make the phthalocyanines water soluble.

The sulfenamides of this invention are formed by reacting 2-mercaptobenzothiazole, an alkali metal salt of 2-mercaptobenzothiazole, preferably sodium 2-mercaptobenzothiazole, a dithiocarbamate, a dithiocarbamic acid, a thiuram disulfide, or 2,2'-dithiobis(benzothiazole) with a primary or secondary amine. The reaction is carried out in the presence of a metal phthalocyanine catalyst and an oxygen-containing gas. The reaction is preferably carried out in solvent or diluent and the reaction mixture should be alkaline. Examples of the thiuram disulfides useful in the process of this invention are found in U.S. Pat. No. 3,116,328, supra, which discloses hydrocarbon substituted thiuram disulfides, particularly thiuram disulfides in which the hydrocarbon is lower alkyl of 1 to 5 carbon atoms, phenyl, or tolyl. The hydrocarbon substituted thiuram disulfides are useful in the practice of the present invention. Examples of sulfenamides from dithiocarbamates and dithiocarbamic acids are found in U.S. Pat. Nos. 2,381,392 (Cl. 260-793) (1945) and 2,424,921 (Cl. 260-247) (1947) of Smith assigned to the Firestone Tire and Rubber Company and British Pat. No. 880,912 assigned to Imperial Chemical Industries, Ltd. (1961), which disclose that the nitrogen substituents of the dithiocarbamic acid nucleus are alkyl or together constitute cycloalkylene or cyclodialkyleneoxy, for example, methyl, ethyl, propyl, butyl, amyl, hexyl, heptyl, octyl, decyl, lauryl, benzyl, cyclohexyl, methylcyclohexyl, cyclopentamethylene, methylcyclopentamethylene, cyclohexamethylene, cyclodiethyleneoxy, and methylcyclodiethyleneoxy. Dithiocarbamates so substituted are useful in the practice of the present invention.

Similarly the primary or secondary amine may contain one or two alkyl radicals, for example, methyl, ethyl, propyl, isopropyl, butyl, tert-butyl, isobutyl, sec. butyl, amyl, sec. amyl, tert-amyl, hexyl, sec. hexyl, heptyl, octyl, tert-octyl, decyl, lauryl, benzyl, or one or two cycloalkyl radicals, for example, cyclopentyl, cyclohexyl, and methylcyclohexyl, or may contain a divalent radical forming a heterocyclic amine, examples of such divalent radicals being cyclopentamethylene, methylcyclopentamethylene and others as aforesaid, the heterocyclic amines being illustrated by piperidine, methylpiperidine, 2-methyl-5-ethylpiperidine, 2ethylpiperidine, morpholine, hexamethylenimine and pyrrolidine.

A catalyst is necessary for out process. Prior to our invention, no catalytic oxidation method was known for preparing sulfenamides. Sulfenamides are prepared commercially by using sodium hypohalite as an oxidizing agent. We have found that the use of sodium hypohalite, which must be used in excess and utilizes a large volume of the reactor, is not necessary. Our process is advantageous because the full volume of the reactor can now be used for reactants. The catalysts of our process are suitable for recycle, for example, the catalyst can be recovered from one reaction and used in subsequent reactions.

PREFERRED EMBODIMENTS

N,N-Diethyl-2-benzothiazolesulfenamide

To prepare N,N-diethyl-2-benzothiazolesulfenamide, 75.1 grams of 96.8 percent 2-mercaptobenzothiazole (0.436 mol.) is added to a 400 ml. beaker. Then 225 ml. of distilled water and 40.1 grams of diethylamine (0.55 mol.) are added to the beaker. The mixture is stirred until solution is obtained. The apparent pH of this solution is 10.9. The solution is transferred to a 1-liter Parr autoclave using about 20 ml. of wash water. The barium salt of cobalt phthalocyanine sulfonate (0.225 grams) is added to the autoclave solution as the oxidation catalyst. The amount of catalyst represents 0.3 percent (w/w) based on the weight of 2-mercaptobenzothiazole.

The autoclave is assembled and purged with oxygen at ambient temperature and pressure for about 2 minutes to remove most of the nitrogen. The oxygen vent is closed and 70 p.s.i. of oxygen is applied to the system. The reactor is heated to 70° C. by a steam-water mixture flowing through the coils of the autoclave. The mixture is stirred continuously during the reaction period. Progress of the reaction is noted by a decrease in oxygen pressure within the reactor. When the pressure drops to 50 or 40 p.s.i., additional oxygen is added to make 70 p.s.i. of oxygen pressure. This type of control is used throughout the reaction. After a 105-minute period, the reaction mixture is cooled to room temperature and the reaction mixture is transferred to a separatory flask. The heavy oily sulfenamide layer is removed from the flask. The oily sulfenamide is dried at room temperature under vacuum overnight with a slight nitrogen purge. Seventy-three grams of product or a 70.5 percent yield of N,N-diethyl-2-benzothiazolesulfenamide is obtained based on the amount of 2-mercaptobenzothiazole used.

The ultraviolet spectrum of the product in methanol is typical of sulfenamides showing $\lambda$ (maximum) 278 m$\mu$ with an $a_s$ of 49.5 l/g-cm. with weaker absorption bands at 288 m$\mu$ and 299 m$\mu$. Elemental analysis of the N,N-diethyl-2-benzothiazolesulfenamide shows 26.06 percent sulfur and 11.36 percent nitrogen. Calculated percentages for N,N-diethyl-2-benzothiazolesulfenamide are 26.46 percent sulfur and 11.75 percent nitrogen. The infrared spectrum is consistent with the proposed structure.

N-tert-Butyl-2-Benzothiazolesulfenamide

To prepare N-tert-butyl-2-benzothiazolesulfenamide, an aqueous sodium 2-mercaptobenzothiazole solution is made by dissolving 50.1 grams of 2-mercaptobenzothiazole (0.3 mol.) in 232 ml. of 1.3 N sodium hydroxide in a 400 ml. beaker. The apparent pH is adjusted to 8.0 using a 25 percent sulfuric acid solution. To this mixture, 27.4 grams of tert-butylamine (0.375 mol.) are added and the apparent pH is adjusted from 10.6 to 10.4 with 25 percent sulfuric acid. The mixture is transferred to a 1-liter Parr autoclave and 0.15 grams of barium salt of cobalt phthalocyanine sulfonate catalyst is added. The reaction is carried out in a similar manner to the diethylamine reaction, supra, at 70° C. with a maximum oxygen pressure of 60 p.s.i. The oxygen line is shut off and when the pressure drops from 60 p.s.i. to 55 or 50 p.s.i. the valve is reopened to bring the oxygen pressure in the autoclave back to 60 p.s.i. The reaction is stopped after 2 hours and cooled to room temperature. The product is filtered and dried to give 53.8 grams of solids that assay 88.5 percent for N-tert-butyl-2-benzothiazolesulfenamide and 11 percent for 2,2'-dithiobis(benzothiazole). This is a 65.6 percent yield for N-tert-butyl-2-benzothiazolesulfenamide based on the amount of 2-mercaptobenzothiazole used.

To prepare N-tert-butyl-2-benzothiazolesulfenamide from 2,2'-dithiobis(benzothiazole), 74.7 grams of 2,2'-dithiobis(benzothiazole) and 225 ml. distilled water are added to a 400 ml. beaker. To the mixture is added 41.1 grams of tert-butylamine (0.565 mol.) and 0.1125 gram of barium salt of cobalt phthalocyanine sulfonate (0.15 percent) based on 2,2'-dithiobis(benzothiazole). The mixture is stirred and the resulting apparent pH is 11.9. The reaction mixture is transferred to a 1-liter Parr autoclave and treated with oxygen under 60 p.s.i. at 70° C. for 2 hours in a similar manner to the diethylamine reaction, supra. The mixture is stirred continuously during the reaction and as the oxygen pressure drops to 45 to 50 p.s.i. additional oxygen is added to make 60 p.s.i. oxygen pressure. After 2 hours the reaction mixture is removed from the autoclave and has an apparent pH of 11.0. The mixture is filtered and the solids are dried. The dried solids weigh 78.5 grams and assay 83.9 percent for N-tert-butyl-2-benzothiazolesulfenamide. These results indicate an overall yield of 55.5 percent sulfenamide based on the amount of starting 2,2'-dithiobis(benzothiazole).

A recycled catalyst is useful in our invention. To illustrate the use of a recycled catalyst, 83.5 grams of 2-mercaptobenzothiazole (0.5 mol.), 109.6 grams of tert-butylamine (1.5 mol.), and 225 ml. of distilled water are added to a 600 ml. beaker. The mixture is stirred and the pH is adjusted to 10.8 using glacial acetic acid. The mixture is transferred to a 1-liter Parr autoclave and 0.25 grams of the barium salt of cobalt phthalocyanine sulfonic acid is added. The reaction is carried out at 70° C. with a maximum of 60 p.s.i. of oxygen pressure for 30 minutes. During this time, the reaction rapidly consumes oxygen so that a total of 235 p.s.i. are added. The reaction is cooled and filtered to give 82.6 grams of solid N-tert-butyl-2-benzothiazolesulfenamide upon drying. The filtrate is returned to the autoclave and 83.5 grams of 2-mercaptobenzothiazole and 37 grams of tert-butylamine are added. No additional catalyst is used. The reaction is continued for two hours to yield 119.2 grams of product which assays 91.5 percent for sulfenamide. The overall yield which included both cycles based on MBT is 80.5 percent sulfenamide.

In using cobalt phthalocyanine as catalyst for the preparation of 2-tert-butylaminothio(benzothiazole) an organic solvent is advantageous because of insolubility of the catalyst in polar solvent systems. To prepare the sulfenamide using cobalt phthalocyanine add 75.1 grams of 97 percent MBT (0.437 mol.) and 275 ml. of pyridine to a 400 ml. beaker. Stir the mixture until solution is obtained. Then add 0.225 grams of cobalt phthalocyanine (0.3 percent by weight based on MBT) and 41.1 grams of tert-butylamine (0.562 mol.)

to the beaker. The apparent pH using a glass calomel electrode is now 10.3. The reaction mixture is transferred to a 1-liter Parr autoclave. The reaction is carried out in the temperature range of 68° to 75° C. under 45 to 60 p.s.i. of oxygen pressure for a period of 1.5 hours. After the reaction is terminated, the apparent pH is still 10.3. The reaction mixture is treated with 1,100 ml. of water and filtered. The residue is washed with an additional 200 ml. of water and dried to give 77 grams of product that assays 98.9 percent for tert-butylaminothio(benzothiazole). This gives a 73.4 percent overall yield of sulfenamide based on the amount of starting MBT.

2(2,6-Dimethyl-4-Morpholinothio)Benzothiazole

To prepare 2-(2,6-dimethyl-4-morpholinothio)benzothiazole 75.1 grams of 96.8 percent 2-mercaptobenzothiazole (0.436 mol.) and 200 ml. of an isopropanol-water solution are added to a 400 ml. beaker. The isopropanol-water solution is composed of 1-volume of water to 1-volume of isopropanol. Eighty-three grams of 2,6-dimethyl-morpholine (0.72 mol.) and 20 ml. of 5 N aqueous NaOH are added to the mixture in the beaker. The resulting apparent pH is 9.38. The mixture is transferred to a 1-liter Parr autoclave using 25 ml. of 1:1 isopropanol-water wash solution. Then the barium salt of cobalt phthalocyanine sulfonic acid catalyst (0.225 grams) is added. The reaction is carried out at 70° C. with oxygen pressure varying from 10 p.s.i. to 70 p.s.i. in a similar manner to the diethylamine reaction, supra. The reaction is stopped after 195 minutes. The reaction mixture is filtered and the residue is air dried to give 89 grams of product. This product assays 94.5 percent for 2-(2,6-dimethyl-4-morpholinothio)benzothiazole to give a 69 percent overall yield based on 2-mercaptobenzothiazole.

2-(Morpholinothio)Benzothiazole

To prepare 2-(morpholinothio)benzothiazole 75.1 grams of 96.8 percent 2-mercaptobenzothiazole (0.436 mol.) and 200 ml. of distilled water are added to a 400 ml. beaker. To this mixture are added 78.4 grams of morpholine (0.90 mol.) and 0.225 grams of barium salt of cobalt phthalocyanine sulfonic acid. The mixture is stirred and transferred to a 1-liter Parr autoclave with the aid of 25 ml. of water. A 100 ml. aliquot of chloroform is added to the autoclave. Then the reaction is carried out in a similar manner to the diethylamine reaction, supra, at ±70° C. with 35 to 70 p.s.i. oxygen pressure for three hours. After the reaction is stopped, the mixture is cooled to room temperature. A three-phase mixture is obtained: an aqueous layer above, and a heavy chloroform layer which contains solids. The chloroform layer is separated from the aqueous layer and then filtered to remove the solid material which is 2,2'-dithiobis(benzothiazole). The chloroform solution is stripped under vacuum with a nitrogen purge at room temperature to give 41 grams of crude 2-(morpholinothio)-benzothiazole. The product assays 97.6 percent sulfenamide to give an overall yield of 31 percent 2-(morpholinothio)benzothiazole based on the starting amount of 2-mercaptobenzothiazole.

N-Cyclohexyl-2-Benzothiazolesulfenamide

The N-cyclohexyl-2-benzothiazolesulfenamide is prepared in a similar manner to the diethylamine reaction, supra, except cyclohexylamine is used in place of diethylamine. A yield of 70.3 percent N-cyclohexyl-2-benzothiazolesulfenamide is obtained.

2-(Hexahydroazepin-1-ylthio)benzothiazole

The 2--(hexahydroazepin-1-ylthio)benzothiazole is prepared in a similar manner to the diethylamine reaction, supra, except hexamethyleneimine is used as a reactant in place of diethylamine. The 2-(hexahydroazepin-1-ylthio)benzothiazole is obtained in a 25.7 percent yield.

N,N-Diethylthiocarbamyl-N'-Cyclohexylsulfenamide

To prepare N,N-diethylthiocarbamyl-N'-cyclohexylsulfenamide, 21.9 grams of diethylamine (0.3 mol.), 12.0 grams sodium hydroxide and 400 ml. of water are added to a 1-liter, three-necked reaction flask. The solution is stirred and cooled while 22.8 grams of carbon disulfide (0.3 mol.) is slowly added to form the sodium salt of N,N-diethyldithiocarbamic acid. The reaction mixture is stirred at 20° C. for 20 minutes to insure complete formation of the salt, after which 60.0 grams of cyclohexylamine (0.6 mol.) and 0.154 gram of the barium salt of cobalt phthalocyanine sulfonic acid are added. The apparent pH of this solution is 11.7. Sufficient 6N hydrochloric acid (70 ml.) is added with stirring and cooling at 60° C. to give an apparent pH of 11.0.

The reaction solution is stirred and the temperature maintained in the range of 35°–42° C., while oxygen is sparged through the solution at atmospheric pressure for 3 hours and 20 minutes. After this time the reaction is allowed to stand overnight and an oil separates out which solidifies on stirring. The solid is filtered off and dried to give 28 grams of crude greenish colored product (38 percent yield) melting at 56°–61° C. Some of the material purified by silica chromatography using benzene as eluant gives crystals melting at 64 – 65.2° C. The reported melting point is 64°–65° C., *J. Org. Chem.*, *XIV*, 925 (1949). The infrared spectrum is consistent with the proposed structure by showing an N-H stretch (3,220 cm.$^{-1}$), C-H stretch (2,940 cm.$^{-1}$), and no carbonyl is present in the 1,600–1,850 cm.$^{-1}$ region. Strong bands at 1,492, 1,265, and 1,200 cm.$^{-1}$ are present in the thioureide

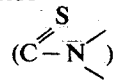

region of the infrared spectrum. The elemental analyses are consistent with the proposed structure: Sulfur found – 26.88 percent and 26.84 percent (Theory – 26.03 percent); Nitrogen found – 11.33 percent (Theory – 11.36 percent). Comparable results are obtained in preparing other sulfenamides from dithiocarbamic acids.

The preferred catalyst of our invention is the barium salt of cobalt phthalocyanine sulfonic acid. The barium salt of cobalt phthalocyanine sulfonic acid can be prepared in the following manner. The cobalt phthalocyanine is sulfonated, Approximately 60 ml. of 20–23 percent fuming sulfuric acid is charged into a three-necked reaction flask. Exactly 15 grams of cobalt phthalocyanine is added in small amounts with stirring. The temperature is held below 40° C. during the addition. After complete addition of the cobalt phthalocyanine, the temperature is raised to 80° C. and maintained at this temperature for 3 hours. The reaction mixture is cooled to 20° C. and 300 ml. of water are added slowly. The diluted solution is transferred to a beaker and the pH adjusted to pH 5.0 with barium carbonate. The mixture is filtered to remove barium sulfate and the filtrate is stripped to dryness. A 12-gram yield of the barium salt of cobalt phthalocyanine sulfonic acid is obtained.

The crystals are reddish-purple and completely water-soluble. The product assays: Nitrogen, 8.13 percent; Sulfur, 7.02 percent and 6.65 percent which gives an average of 3.4 sulfonate groups per molecule.

Pure oxygen is the preferred oxidizing agent for our process. However, mixtures containing oxygen, for example, air can be used. The pressure within the autoclave can vary from atmospheric to 500 p.s.i. The preferred pressure range is between about 10 to 75 p.s.i. An alkaline medium is required for our process. A pH range between 7.5 to 13 apparent pH units may be used in our process. Under alkaline conditions, the thiazole reactant of the reaction mixture can vary from essentially all 2mercaptobenzothiazole to essentially all sodium 2-mercaptobenzothiazole. In a reaction mixture using 2-mercaptobenzothiazole as a starting material, the apparent pH must be alkaline. The preferred pH range is from about 9.0 to about 11.9. The temperature range preferred is about 45° to about 80° C. However, the temperature can be lowered or raised if other factors such as rate of reaction, hydrolysis, and over-oxidation are compromised. The reaction time depends upon the reaction conditions. Higher temperature, high pH, increased amine concentrations, increased catalysts concentrations, and higher pressures tend to decrease the required reaction time. Preferred catalysts concentrations are 0.1 percent to 0.3 percent by weight based on thiazole reactant. Lower concentrations can be used if longer reaction times and other conditions such as increases in oxygen pressure, amine concentrations, and temperature are employed. The reaction occurs in aqueous, mixed and miscible organic-aqueous, mixed and immiscible organic-aqueous, or organic solvent systems.

Copper Phthalocyanine

To prepare 2-tert-butylaminothio(benzothiazole) using β-copper phthalocyanine there is added 83.5 grams of 2-mercaptobenzothiazole (0.5 mol.) to a one-liter Parr autoclave together with 250 ml. of pyridine, 73.1 grams of tert-butylamine (1.0 mol.), and 1.25 grams of β-copper phthalocyanine. The reaction is carried out under 50 to 70 pounds per square inch of oxygen for 7 hours at a temperature within the range of 70° to 80° C. As the oxygen pressure drops from 70 p.s.i. to 50 p.s.i., additional oxygen is admitted to increase the pressure back to 70 p.s.i.

The reaction solution is filtered to remove a small amount of blue solids then 2,000 ml. of water added and stirred. The product precipitates out, and it is filtered off. After air drying, the product is weighed to give 66 grams of N-tert-butyl-2-(benzothiazolesulfenamide), representing a yield of 55 percent. The material assays 99 percent by UV analysis. No significant amounts of 2,2'-dithiobis(benzothiazothiazole) is detected when the product is tested for methanol insolubles.

Vanadium Phthalocyanine

The catalyst vanadium phthalocyanine is used to prepare 2-tert-butylaminothio(benzothiazole) in the manner described for using copper phthalocyanine. Only 1.0 gram of vanadium phthalocyanine (prepared according to J.C.S., 1936, 1736) is used to obtain a yield of 35.2 grams (29.6 percent) of N-tert-butyl-2-(benzothiazolesulfenamide).

Platinum Phthalocyanine

The catalyst platinum phthalocyanine is used for preparing 2-tert-butylaminothio(benzothiazole) in the manner described for using copper phthalocyanine. Only one gram of platinum phthalocyanine is used to give 26.5 grams (22.3 percent yield) of N-tert-butyl-2-benzothiazolesulfenamide in 5 hours.

It is intended to cover all changes and modifications of the examples of the invention herein chosen for purposes of disclosure which do not constitute departures from the spirit and scope of the invention.

The embodiments of the invention in which an exclusive property or privilege is claimed are defined as follows:

1. The process for preparing a sulfenamide by reacting primary or secondary amine of the formula respectively $RNH_2$ and

where R and R' independently are selected from the group consisting of alkyl of 1 to 12 carbon atoms, benzyl, cyclopentyl, cyclohexyl and methylcyclohexyl or taken with the NH, R and R' together form a heterocycle selected from the group consisting of pyrrolidine, piperidine, methylpiperidine, 2-methyl-5-ethylpiperidine, 2-ethylpiperidine, morpholine, methylmorpholine, dimethylmorpholine and hexamethylenimine and a compound selected from the group consisting of alkali metal salt of 2-mercaptobenzothiazole, 2-mercaptobenzothiazole, 2,2'-dithiobis(benzothiazole), N-substituted dithiocarbamic acid, alkali metal salt of N-substituted dithiocarbamic acid, N-substituted thiuram disulfide, the nitrogen substituents of said dithiocarbamic acid, alkali metal salt thereof and thiuram disulfide being selected from the group consisting of alkyl of 1 to 12 carbon atoms, benzyl, phenyl, tolyl, cyclopentyl, cyclohexyl and methylcyclohexyl or together with the nitrogen constitute a heterocyclic radical selected from the group consisting of piperidino, methylpiperidino, hexamethyleniminyl, morpholino, methylmorpholino, dimethylmorpholino, 2-methyl-5-ethylpiperidino, 2-ethylpiperidino and pyrrolidinyl, forming the sulfenamide in the presence of oxygen or air and an effective amount of metal phthalocyanine catalyst wherein the metal is selected from a group consisting of cobalt, manganese, vanadium, chromium, nickel, iron, platinum, and copper or water soluble derivative of metal phthalocyanine catalyst characterized by the presence of a polar functional substituent selected from the group consisting of $—S(O)_2OH$, $—OH$, $—COOH$ and $—PO(OH)_2$.

2. The process for preparing a sulfenamide by reacting primary or secondary amine of the formula respectively $RNH_2$ and

where R and R' independently are selected from the group consisting of alkyl of 1 to 12 carbon atoms, benzyl, cyclopentyl, cyclohexyl and methylcyclohexyl or taken with the NH, R and R' together form a heterocycle selected from the group consisting of pyrrolidine, piperidine, methylpiperidine, 2-methyl-5-ethylpiperidine, 2-ethylpiperidine, morpholine, methylmorpholine, dimethylmorpholine, and hexamethylenimine and a compound selected from the group consisting of sodium salt of 2-mercaptobenzothiazole, 2-mercaptobenzothiazole, 2,2'-dithiobis(benzothiazole), alkali metal salt of N-substituted dithiocarbamic acid, N- substituted thiuram disulfide, the nitrogen substitutents of said alkali metal salt of dithiocarbamic acid and thiuram sulfide being selected from the group consisting of alkyl of one to 12 carbon atoms, benzyl, phenyl, tolyl, cyclopentyl, cyclohexyl and methylcyclohexyl or together with the nitrogen constitute a heterocyclic radical selected from the group consisting of piperidino, methylpiperidino, hexamethyleniminyl, morpholino, methylmorpholino, dimethylmorpholino, 2-methyl-5-ethylpiperidino, 2-ethylpiperidino and pyrrolidinyl, the reaction being conducted in reaction medium selected from the group consisting of aqueous, mixed and miscible organic-aqueous, organic and mixed and immiscible organic-aqueous, forming the sulfenamide in the presence of oxygen or air under a pressure of about 10 to 500 psi and an effective amount of cobalt phthalocyanine or cobalt phthalocyanine sulfonate catalyst at a temperature between the range of about 25° C. to about 100° C. and a pH between the range of about 7.5 to about 13.0.

3. A process according to claim 2 wherein the amine is tert-butylamine, hexamethyleneimine, morpholine, 2,6-dimethylmorpholine, cyclohexylamine, or diethylamine.

4. A process according to claim 3 which comprises reacting tert-butylamine with 2-mercaptobenzothiazole and forming N-tert-butyl-2-benzothiazolesulfenamide.

5. A process according to claim 4 wherein the catalyst is the barium salt of cobalt phthalocyanine sulfonic acid.

6. A process according to claim 3 which comprises reacting diethylamine with 2-mercaptobenzothiazole and forming N,N-diethyl-2-benzothiazolesulfenamide.

7. The process according to claim 6 wherein the catalyst is the barium salt of cobalt phthalocyanine sulfonic acid.

8. A process according to claim 3 which comprises reacting cyclohexylamine with 2-mercaptobenzothiazole and forming N-cyclohexyl-2-benzothiazolesulfenamide.

9. A process according to claim 8 wherein the catalyst is the barium slat of cobalt phthalocyanine sulfonic acid.

10. A process according to claim 3 which comprises reacting 2,6-dimethylmorpholine with 2-mercaptobenzothiazole and forming 2-(2,6-dimethyl-4-morpholinothio)benzothiazole.

11. A process according to claim 10 wherein the catalyst is the barium salt of cobalt phthalocyanine sulfonic acid.

12. A process according to claim 3 which comprises reacting morpholine with 2-mercaptobenzothiazole and forming 2-(morpholinothio)benzothiazole.

13. A process according to claim 12 wherein the catalyst is the barium salt of cobalt phthalocyanine sulfonic acid.

14. A process according to claim 3 which comprises reacting hexamethyleneimine with 2-mercaptobenzothiazole and forming 2-hexahydroazepin-1-ylthio)benzothiazole.

15. A process according to claim 14 wherein the catalyst is the barium salt of cobalt phthalocyanine sulfonic acid.

16. A process according to claim 3 which comprises reacting cyclohexylamine with N,N-diethyldithiocarbamic acid and forming N,N-diethylthiocarbamyl-N'-cyclohexylsulfenamide.

17. A process according to claim 16 wherein the catalyst is the barium salt of cobalt phthalocyanine sulfonic acid.

* * * * *